United States Patent
Yan et al.

(10) Patent No.: US 10,295,236 B2
(45) Date of Patent: May 21, 2019

(54) COMPRESSOR HEATING SYSTEM

(71) Applicant: Trane International Inc., Piscataway, NJ (US)

(72) Inventors: Chuan Yan, Tyler, TX (US); Don Schuster, Lindale, TX (US); Drew Whitehurst, Tyler, TX (US)

(73) Assignee: Trane International Inc., Piscataway, NJ (US)

(*) Notice: Subject to any disclaimer, the term of this patent is extended or adjusted under 35 U.S.C. 154(b) by 363 days.

(21) Appl. No.: 14/822,541

(22) Filed: Aug. 10, 2015

(65) Prior Publication Data

US 2016/0047579 A1    Feb. 18, 2016

Related U.S. Application Data

(60) Provisional application No. 62/036,779, filed on Aug. 13, 2014.

(51) Int. Cl.
*F25B 49/00* (2006.01)

(52) U.S. Cl.
CPC ........ *F25B 49/005* (2013.01); *F25B 2500/08* (2013.01); *F25B 2600/021* (2013.01); *F25B 2700/2106* (2013.01); *F25B 2700/21153* (2013.01); *Y02B 30/741* (2013.01)

(58) Field of Classification Search
CPC ............... F25B 49/005; F25B 2500/08; F25B 2600/021; F25B 2700/21153; F25B 2700/2106; Y02B 30/741
See application file for complete search history.

(56) References Cited

U.S. PATENT DOCUMENTS

| | | | | |
|---|---|---|---|---|
| 4,420,947 A | * | 12/1983 | Yoshino | F24D 11/0264 62/160 |
| 4,707,646 A | * | 11/1987 | Thompson | H02H 7/085 318/434 |
| 5,006,744 A | * | 4/1991 | Archer | H02K 29/06 310/58 |
| 5,086,266 A | * | 2/1992 | Shiga | H02P 9/30 322/28 |
| 5,159,218 A | * | 10/1992 | Murry | G05D 7/0676 310/68 B |

(Continued)

FOREIGN PATENT DOCUMENTS

JP     2002332974 A  * 11/2002 .......... F04C 18/0215

OTHER PUBLICATIONS

Williams, Steve; "Variable Speed Motor Control Using a Microcontroller"; Retrieved from: https://web.archive.org/web/*/http://low-powerdesign.com/120215-article-variable-speed-motor-control.htm; 2012; 5 pages.

*Primary Examiner* — Ljiljana V. Ciric
(74) *Attorney, Agent, or Firm* — Conley Rose, P.C.; J. Robert Brown, Jr.

(57) ABSTRACT

A compressor heating system includes a compressor drive controller electrically coupled to an outdoor controller configured to selectively implement a pulse width modulation algorithm to deliver a pulsed direct current (DC) from the compressor drive controller to at least one stator winding of a motor of a variable speed compressor to provide heat to the compressor to prevent refrigerant migration to the compressor when the compressor remains idle with respect to operating in a cooling or heating mode.

17 Claims, 4 Drawing Sheets

(56) References Cited

U.S. PATENT DOCUMENTS

| | | | | |
|---|---|---|---|---|
| 5,195,327 A * | 3/1993 | Kim | F01M 5/005 | 62/158 |
| 5,327,064 A * | 7/1994 | Arakawa | H02K 29/08 | 307/117 |
| 5,410,230 A * | 4/1995 | Bessler | H02P 6/085 | 318/471 |
| 5,506,487 A * | 4/1996 | Young | H02P 6/28 | 318/400.13 |
| 5,723,967 A * | 3/1998 | Hongo | H02P 6/21 | 318/400.11 |
| 6,121,747 A * | 9/2000 | Trachtenberg | H02P 23/186 | 318/600 |
| 6,412,293 B1 * | 7/2002 | Pham | F04C 18/0215 | 236/46 R |
| 6,423,118 B1 * | 7/2002 | Becerra | B01D 46/0086 | 95/19 |
| 6,895,176 B2 * | 5/2005 | Archer | H02P 6/34 | 310/220 |
| 7,106,019 B2 * | 9/2006 | Becerra | H02P 6/34 | 318/400.01 |
| 7,332,842 B2 * | 2/2008 | Kasahara | F04D 29/263 | 310/84 |
| 7,466,089 B2 * | 12/2008 | Beifus | H02P 6/04 | 318/254.1 |
| 7,573,217 B2 * | 8/2009 | Solan, Jr. | H02P 6/06 | 318/400.07 |
| 7,843,157 B2 * | 11/2010 | Archer | H02P 6/34 | 318/504 |
| 8,115,458 B2 * | 2/2012 | Kamata | H02P 21/50 | 323/207 |
| 8,234,879 B2 * | 8/2012 | Hwang | F25B 49/025 | 62/228.1 |
| 8,353,180 B2 * | 1/2013 | Okamoto | F25B 31/004 | 62/470 |
| 8,944,777 B2 * | 2/2015 | Sakanobe | F25B 49/025 | 417/410.1 |
| 9,071,183 B2 * | 6/2015 | Becerra | H02P 5/74 | |
| 9,263,984 B2 * | 2/2016 | Hatakeyama | F04C 29/0085 | |
| 9,322,587 B2 * | 4/2016 | Shinomoto | H02M 7/53871 | |
| 9,806,660 B1 * | 10/2017 | Chretien | H02P 27/16 | |
| 9,935,576 B1 * | 4/2018 | Chretien | H02P 25/04 | |
| 9,979,328 B1 * | 5/2018 | Chretien | H02P 5/74 | |
| 2002/0157409 A1 * | 10/2002 | Pham | F04C 23/008 | 62/228.3 |
| 2003/0066638 A1 * | 4/2003 | Qu | C09K 5/14 | 165/186 |
| 2006/0250105 A1 * | 11/2006 | Jadric | F25B 49/025 | 318/701 |
| 2007/0013325 A1 * | 1/2007 | Kiuchi | H02P 5/74 | 318/34 |
| 2007/0108934 A1 * | 5/2007 | Smith | F25B 31/006 | 318/701 |
| 2008/0168784 A1 * | 7/2008 | Choi | F25B 1/10 | 62/157 |
| 2011/0225992 A1 * | 9/2011 | Lee | F24F 1/0003 | 62/80 |
| 2012/0297819 A1 * | 11/2012 | Becerra | H02P 5/74 | 62/498 |
| 2013/0036759 A1 * | 2/2013 | Harada | F25B 31/006 | 62/259.2 |
| 2013/0180273 A1 * | 7/2013 | Hatakeyama | F04B 35/04 | 62/115 |
| 2014/0044562 A1 * | 2/2014 | Lee | F04C 23/02 | 417/32 |
| 2014/0182318 A1 * | 7/2014 | Eom | F25B 49/02 | 62/129 |
| 2015/0168033 A1 * | 6/2015 | Yamakawa | H02P 27/02 | 62/324.6 |
| 2015/0192337 A1 * | 7/2015 | Choi | F25B 49/025 | 62/230 |
| 2015/0192346 A1 * | 7/2015 | Lee | F25D 21/006 | 62/129 |
| 2015/0207447 A1 * | 7/2015 | Sato | H02P 1/46 | 318/400.11 |
| 2015/0377536 A1 * | 12/2015 | West | F04C 29/0085 | 62/115 |
| 2016/0036360 A1 * | 2/2016 | Maekawa | D06F 58/206 | 318/400.13 |
| 2016/0047579 A1 * | 2/2016 | Yan | F25B 49/005 | 62/228.1 |
| 2016/0069347 A1 * | 3/2016 | Zhang | F04C 23/008 | 417/45 |
| 2016/0118924 A1 * | 4/2016 | Ishizeki | H02P 27/04 | 318/400.3 |
| 2016/0344324 A1 * | 11/2016 | Jang | D06F 37/304 | |
| 2017/0063275 A1 * | 3/2017 | Park | H02P 29/62 | |
| 2017/0070172 A1 * | 3/2017 | Je | H02P 21/24 | |
| 2017/0077857 A1 * | 3/2017 | Chretien | H02P 1/426 | |
| 2017/0077859 A1 * | 3/2017 | Chretien | H02P 27/06 | |
| 2017/0078109 A1 * | 3/2017 | Han | H04L 12/2816 | |

\* cited by examiner

COMPRESSOR HEATING SYSTEM

CROSS-REFERENCE TO RELATED APPLICATIONS

The present application claims priority under 35 U.S.C. 119(e) to U.S. Provisional Patent Application No. 62/036,779 filed on Aug. 13, 2014 by Yan, et al., and entitled "Increased Efficiency of Crank Case Heating Using Pulsed Stator Heat," the disclosure of which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Vapor compressor type heating, ventilation, and/or air conditioning (HVAC) systems may generally comprise a compressor that may be selectively operated based on a demand for heating or cooling. Because refrigerant in an HVAC system may tend to migrate to colder locations in the HVAC system, refrigerant may often migrate to the compressor and become dissolved in the compressor oil when the compressor is not being operated. When the compressor is thereafter started, any refrigerant dissolved in the compressor oil may rapidly vaporize and carry oil away from bearing surfaces, which may cause damage and/or severely diminish the life of the compressor. Generally, migration of the refrigerant to the idle compressor may often be minimized by keeping the compressor warm. Current solutions for keeping the compressor warm may include utilizing resistance heaters mounted within or externally of the compressor, which are often energy inefficient.

SUMMARY

In some embodiments of the disclosure, a compressor heating system is disclosed as comprising a compressor, a compressor drive controller electrically coupled to the compressor and configured to selectively provide a pulsed direct current (DC) to a stator winding of a motor of the compressor, and an outdoor unit controller electrically coupled to the compressor drive controller.

In other embodiments of the disclosure, an HVAC system is disclosed as comprising a compressor heating system comprising: a compressor; a compressor drive controller electrically coupled to the compressor and configured to selectively provide a pulsed DC to a stator winding of a motor of the compressor; and an outdoor unit controller electrically coupled to the compressor drive controller.

In yet other embodiments of the disclosure, a method of heating a compressor is disclosed as comprising: providing a compressor heating system comprising a compressor, a compressor drive controller electrically coupled to the compressor, and an outdoor unit controller electrically coupled to the compressor drive controller in an HVAC system; and selectively pulsing a DC through a stator winding of a motor of the compressor.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION

Figure 1:
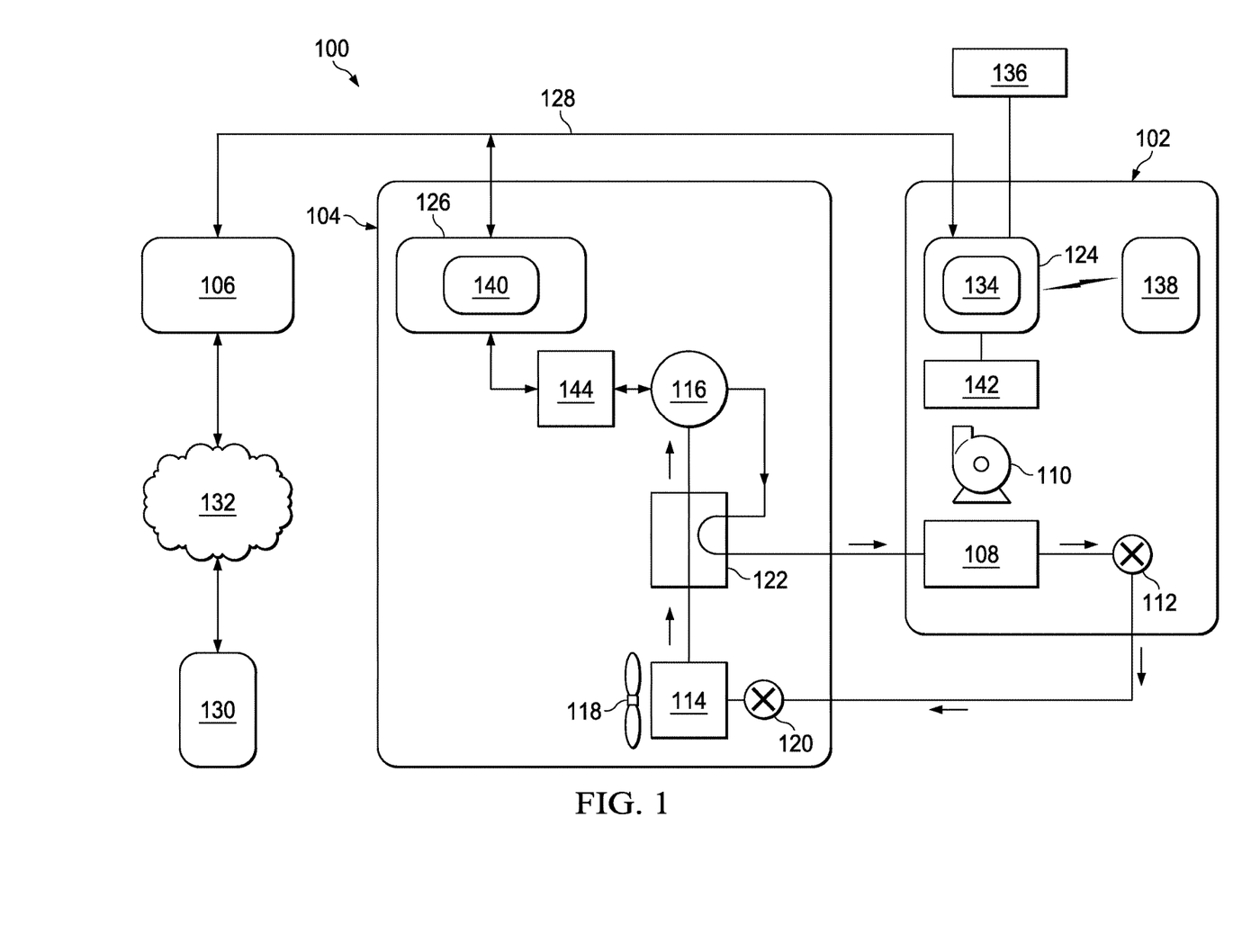
FIG. 1 is a schematic diagram of an HVAC system according to an embodiment of the disclosure.

Referring now to FIG. 1, a schematic diagram of an HVAC system 100 is shown according to an embodiment of the disclosure. Most generally, HVAC system 100 comprises a heat pump system that may be selectively operated to implement one or more substantially closed thermodynamic refrigeration cycles to provide a cooling functionality (hereinafter, "cooling mode") and/or a heating functionality (hereinafter, "heating mode"). The HVAC system 100, configured as a heat pump system, generally comprises an indoor unit 102, an outdoor unit 104, and a system controller 106 that may generally control operation of the indoor unit 102 and/or the outdoor unit 104.

Indoor unit 102 generally comprises an indoor heat exchanger 108, an indoor fan 110, an indoor metering device 112, and an indoor controller 124. The indoor heat exchanger 108 may generally be configured to promote heat exchange between refrigerant carried within internal tubing of the indoor heat exchanger 108 and an airflow that may contact the indoor heat exchanger 108 but that is segregated from the refrigerant. In some embodiments, indoor heat exchanger 108 may comprise a plate-fin heat exchanger. However, in other embodiments, indoor heat exchanger 108 may comprise a spine fin heat exchanger, a microchannel heat exchanger, or any other suitable type of heat exchanger.

The indoor fan 110 may generally comprise a centrifugal blower comprising a blower housing, a blower impeller at least partially disposed within the blower housing, and a blower motor configured to selectively rotate the blower impeller. The indoor fan 110 may generally be configured to provide airflow through the indoor unit 102 and/or the indoor heat exchanger 108 to promote heat transfer between the airflow and a refrigerant flowing through the indoor heat exchanger 108. The indoor fan 110 may also be configured to deliver temperature-conditioned air from the indoor unit 102 to one or more areas and/or zones of a climate controlled structure. The indoor fan 110 may generally comprise a mixed-flow fan and/or any other suitable type of fan. The indoor fan 110 may generally be configured as a modulating and/or variable speed fan capable of being operated at many speeds over one or more ranges of speeds. In other embodiments, the indoor fan 110 may be configured as a multiple speed fan capable of being operated at a plurality of operating speeds by selectively electrically powering different ones of multiple electromagnetic windings of a motor of the indoor fan 110. In yet other embodiments, however, the indoor fan 110 may be a single speed fan.

The indoor metering device 112 may generally comprise an electronically-controlled motor-driven electronic expansion valve (EEV). In some embodiments, however, the indoor metering device 112 may comprise a thermostatic expansion valve, a capillary tube assembly, and/or any other suitable metering device. In some embodiments, while the indoor metering device 112 may be configured to meter the volume and/or flow rate of refrigerant through the indoor metering device 112, the indoor metering device 112 may also comprise and/or be associated with a refrigerant check valve and/or refrigerant bypass configuration when the direction of refrigerant flow through the indoor metering device 112 is such that the indoor metering device 112 is not intended to meter or otherwise substantially restrict flow of the refrigerant through the indoor metering device 112.

Outdoor unit 104 generally comprises an outdoor heat exchanger 114, a compressor 116, an outdoor fan 118, an outdoor metering device 120, a reversing valve 122, and an outdoor controller 126. The outdoor heat exchanger 114 may generally be configured to promote heat transfer between a refrigerant carried within internal passages of the outdoor heat exchanger 114 and an airflow that contacts the outdoor heat exchanger 114 but that is segregated from the refrigerant. In some embodiments, outdoor heat exchanger 114 may comprise a plate-fin heat exchanger. However, in other embodiments, outdoor heat exchanger 114 may comprise a spine-fin heat exchanger, a microchannel heat exchanger, or any other suitable type of heat exchanger.

The compressor 116 may generally comprise a variable speed scroll-type compressor that may generally be configured to selectively pump refrigerant at a plurality of mass flow rates through the indoor unit 102, the outdoor unit 104, and/or between the indoor unit 102 and the outdoor unit 104. In some embodiments, the compressor 116 may comprise a rotary type compressor configured to selectively pump refrigerant at a plurality of mass flow rates. In alternative embodiments, however, the compressor 116 may comprise a modulating compressor that is capable of operation over a plurality of speed ranges, a reciprocating-type compressor, a single speed compressor, and/or any other suitable refrigerant compressor and/or refrigerant pump. In some embodiments, the compressor 116 may be controlled by a compressor drive controller 144, also referred to as a compressor drive and/or a compressor drive system.

The outdoor fan 118 may generally comprise an axial fan comprising a fan blade assembly and fan motor configured to selectively rotate the fan blade assembly. The outdoor fan 118 may generally be configured to provide airflow through the outdoor unit 104 and/or the outdoor heat exchanger 114 to promote heat transfer between the airflow and a refrigerant flowing through the indoor heat exchanger 108. The outdoor fan 118 may generally be configured as a modulating and/or variable speed fan capable of being operated at a plurality of speeds over a plurality of speed ranges. In other embodiments, the outdoor fan 118 may comprise a mixed-flow fan, a centrifugal blower, and/or any other suitable type of fan and/or blower, such as a multiple speed fan capable of being operated at a plurality of operating speeds by selectively electrically powering different multiple electromagnetic windings of a motor of the outdoor fan 118. In yet other embodiments, the outdoor fan 118 may be a single speed fan. Further, in other embodiments, however, the outdoor fan 118 may comprise a mixed-flow fan, a centrifugal blower, and/or any other suitable type of fan and/or blower.

The outdoor metering device 120 may generally comprise a thermostatic expansion valve. In some embodiments, however, the outdoor metering device 120 may comprise an electronically-controlled motor driven EEV similar to indoor metering device 112, a capillary tube assembly, and/or any other suitable metering device. In some embodiments, while the outdoor metering device 120 may be configured to meter the volume and/or flow rate of refrigerant through the outdoor metering device 120, the outdoor metering device 120 may also comprise and/or be associated with a refrigerant check valve and/or refrigerant bypass configuration when the direction of refrigerant flow through the outdoor metering device 120 is such that the outdoor metering device 120 is not intended to meter or otherwise substantially restrict flow of the refrigerant through the outdoor metering device 120.

The reversing valve 122 may generally comprise a four-way reversing valve. The reversing valve 122 may also comprise an electrical solenoid, relay, and/or other device configured to selectively move a component of the reversing valve 122 between operational positions to alter the flowpath of refrigerant through the reversing valve 122 and consequently the HVAC system 100. Additionally, the reversing valve 122 may also be selectively controlled by the system controller 106 and/or an outdoor controller 126.

The system controller 106 may generally be configured to selectively communicate with an indoor controller 124 of the indoor unit 102, an outdoor controller 126 of the outdoor unit 104 and/or other components of the HVAC system 100. In some embodiments, the system controller 106 may be configured to control operation of the indoor unit 102 and/or the outdoor unit 104. Additionally, in some embodiments, the system controller 106 may comprise a temperature sensor and/or may further be configured to control heating and/or cooling of zones associated with the HVAC system 100. In other embodiments, however, the system controller 106 may be configured as a thermostat for controlling the supply of conditioned air to zones associated with the HVAC system 100.

The system controller 106 may also generally comprise a touchscreen interface for displaying information and for receiving user inputs. The system controller 106 may display information related to the operation of the HVAC system 100 and may receive user inputs related to operation of the HVAC system 100. However, the system controller 106 may further be operable to display information and receive user inputs tangentially and/or unrelated to operation of the HVAC system 100. In some embodiments, however, the system controller 106 may not comprise a display and may derive all information from inputs from remote sensors and remote configuration tools.

In some embodiments, the system controller 106 may be configured for selective bidirectional communication over a communication bus 128. In some embodiments, portions of the communication bus 128 may comprise a three-wire connection suitable for communicating messages between the system controller 106 and one or more of the HVAC system 100 components configured for interfacing with the communication bus 128. Still further, the system controller 106 may be configured to selectively communicate with HVAC system 100 components and/or any other device 130 via a communication network 132. In some embodiments, the communication network 132 may comprise a telephone network, and the other device 130 may comprise a telephone. In some embodiments, the communication network 132 may comprise the Internet, and the other device 130 may comprise a smartphone and/or other Internet-enabled mobile telecommunication device. In other embodiments, the communication network 132 may also comprise a remote server.

The indoor controller 124 may be carried by the outdoor unit 104 and may generally be configured to receive information inputs, transmit information outputs, and/or otherwise communicate with the system controller 106, the outdoor controller 126, and/or any other device 130 via the communication bus 128 and/or any other suitable medium of communication. In some embodiments, the indoor controller 124 may be configured to communicate with an indoor personality module 134 that may comprise information related to the identification and/or operation of the indoor unit 102. In some embodiments, the indoor controller 124 may be configured to receive information related to a speed of the indoor fan 110, transmit a control output to an electric heat relay, transmit information regarding an indoor fan 110 volumetric flow-rate, communicate with and/or otherwise affect control over an air cleaner 136, and communicate with an indoor EEV controller 138. In some embodiments, the indoor controller 124 may be configured to communicate with an indoor fan controller 142 and/or otherwise affect control over operation of the indoor fan 110. In some embodiments, the indoor personality module 134 may comprise information related to the identification and/or operation of the indoor unit 102 and/or a position of the outdoor metering device 120.

The indoor EEV controller 138 may be configured to receive information regarding temperatures and/or pressures of the refrigerant in the indoor unit 102. More specifically, the indoor EEV controller 138 may be configured to receive information regarding temperatures and pressures of refrigerant entering, exiting, and/or within the indoor heat exchanger 108. Further, the indoor EEV controller 138 may be configured to communicate with the indoor metering device 112 and/or otherwise affect control over the indoor metering device 112. The indoor EEV controller 138 may also be configured to communicate with the outdoor metering device 120 and/or otherwise affect control over the outdoor metering device 120.

The outdoor controller 126 may be carried by the outdoor unit 104 and may be configured to receive information inputs, transmit information outputs, and/or otherwise communicate with the system controller 106, the indoor controller 124, and/or any other device via the communication bus 128 and/or any other suitable medium of communication. In some embodiments, the outdoor controller 126 may be configured to communicate with an outdoor personality module 140 that may comprise information related to the identification and/or operation of the outdoor unit 104. In some embodiments, the outdoor controller 126 may be configured to receive information related to an ambient temperature associated with the outdoor unit 104, information related to a temperature of the outdoor heat exchanger 114, and/or information related to refrigerant temperatures and/or pressures of refrigerant entering, exiting, and/or within the outdoor heat exchanger 114 and/or the compressor 116. In some embodiments, the outdoor controller 126 may be configured to transmit information related to monitoring, communicating with, and/or otherwise affecting control over the compressor 116, the outdoor fan 118, a solenoid of the reversing valve 122, a relay associated with adjusting and/or monitoring a refrigerant charge of the HVAC system 100, a position of the indoor metering device 112, and/or a position of the outdoor metering device 120. The outdoor controller 126 may further be configured to communicate with and/or control a compressor drive controller 144 that is configured to electrically power and/or control the compressor 116.

The HVAC system 100 is shown configured for operating in a so-called heating mode in which heat may generally be absorbed by refrigerant at the outdoor heat exchanger 114 and rejected from the refrigerant at the indoor heat exchanger 108. Starting at the compressor 116, the compressor 116 may be operated to compress refrigerant and pump the relatively high temperature and high pressure compressed refrigerant through the reversing valve 122 and to the indoor heat exchanger 108, where the refrigerant may transfer heat to an airflow that is passed through and/or into contact with the indoor heat exchanger 108 by the indoor fan 110. After exiting the indoor heat exchanger 108, the refrigerant may flow through and/or bypass the indoor metering device 112, such that refrigerant flow is not substantially restricted by the indoor metering device 112. Refrigerant generally exits the indoor metering device 112 and flows to the outdoor metering device 120, which may meter the flow of refrigerant through the outdoor metering device 120, such that the refrigerant downstream of the outdoor metering device 120 is at a lower pressure than the refrigerant upstream of the outdoor metering device 120. From the outdoor metering device 120, the refrigerant may enter the outdoor heat exchanger 114. As the refrigerant is passed through the outdoor heat exchanger 114, heat may be transferred to the refrigerant from an airflow that is passed through and/or into contact with the outdoor heat exchanger 114 by the outdoor fan 118. Refrigerant leaving the outdoor heat exchanger 114 may flow to the reversing valve 122, where the reversing valve 122 may be selectively configured to divert the refrigerant back to the compressor 116, where the refrigeration cycle may begin again.

Alternatively, to operate the HVAC system 100 in a so-called cooling mode, most generally, the roles of the indoor heat exchanger 108 and the outdoor heat exchanger 114 are reversed as compared to their operation in the above-described heating mode. For example, the reversing valve 122 may be controlled to alter the flow path of the refrigerant from the compressor 116 to outdoor heat exchanger 114 first and then to the indoor heat exchanger 108, the indoor metering device 112 may be enabled, and the outdoor metering device 120 may be disabled and/or bypassed. In cooling mode, heat may generally be absorbed by refrigerant at the indoor heat exchanger 108 and rejected by the refrigerant at the outdoor heat exchanger 114. As the refrigerant is passed through the indoor heat exchanger 108, the indoor fan 110 may be operated to move air into contact with the indoor heat exchanger 108, thereby transferring heat to the refrigerant from the air surrounding the indoor heat exchanger 108. Additionally, as refrigerant is passed through the outdoor heat exchanger 114, the outdoor fan 118 may be operated to move air into contact with the outdoor heat exchanger 114, thereby transferring heat from the refrigerant to the air surrounding the outdoor heat exchanger 114.

Figure 2:
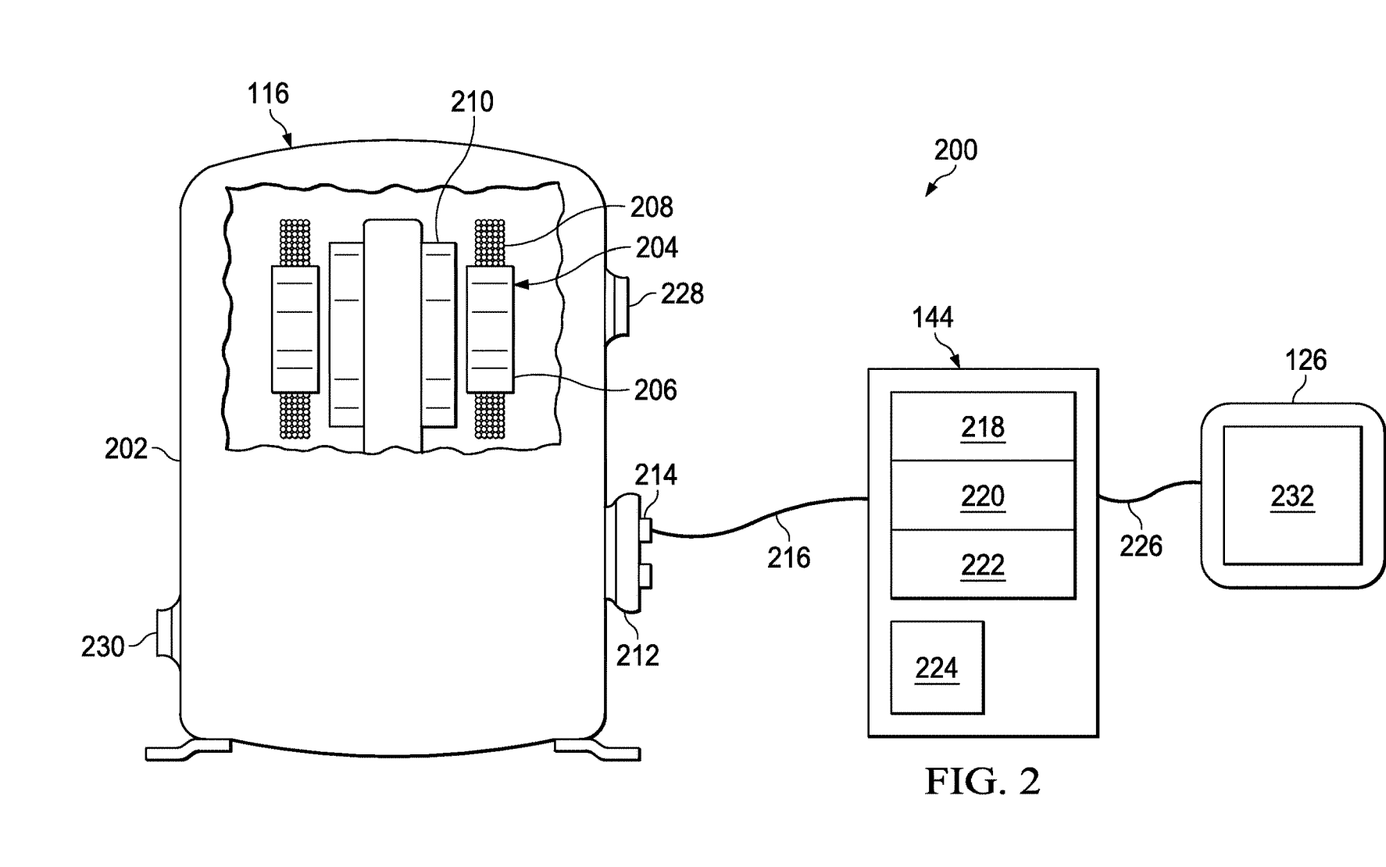
FIG. 2 is a schematic diagram of a compressor heating system according to an embodiment of the disclosure.

Referring now to FIG. 2, a schematic diagram of a compressor heating system 200 is shown according to an embodiment of the disclosure. Compressor heating system 200 generally comprises the compressor 116, the compressor drive controller 144, and the outdoor controller 126 of FIG. 1. The compressor 116 may generally comprise a variable speed scroll-type compressor and may generally comprise a housing 202, a motor 204, and a compressor interface 212. The housing 202 generally forms an outer shell of the compressor 116 that is configured to substantially envelope and/or accommodate the internal components of the compressor 116. The housing 202 may also hermetically seal the internal components of the compressor 116 from an external environment. As shown in FIG. 2, the housing 202 is partially cut away to show the internal components of the compressor 116. Additionally, the housing 202 of the compressor 116 may also be configured to allow ingress and egress of the refrigerant to the internal components of the compressor 116 through at least one inlet 228 and at least one outlet 230, respectively.

The motor 204 of the compressor 116 generally comprises an alternating current (AC) electric motor, that is, more specifically, a three-phase induction motor. The motor 204 may generally be enclosed within the housing 202 and comprise a stator 206 having a plurality of stator windings 208. Because the compressor 116 may be configured to operate on three-phase alternating current power, the stator windings 208 may comprise three magnetic poles. The motor 204 may also comprise a rotor 210. The motor 204 may primarily be configured to operate the compressor 116 by inducing an electromagnetic field from the stator 206 to the rotor 210 that is produced by passing a current through the stator windings 208. The induced electromagnetic field may generally cause the rotor 210 to rotate, thus operating the compressor 116 to compress refrigerant entering the compressor 116 via the inlet 228 and to pump the compressed refrigerant out of the compressor 116 via the outlet 230.

The compressor interface 212 generally comprises a terminal box that is disposed on an outer surface of the housing 202 of the compressor 116. The compressor interface 212 may generally be configured to provide an electrical connection between the compressor drive controller 144 and the motor 204 of the compressor 116 and/or other internal electrical components (i.e., temperature sensor) of the compressor 116. In some embodiments, the compressor interface 212 may comprise at least one terminal 214 configured to accept at least one connection of a wired interface 216 between the compressor 116 and the compressor drive controller 144. However, in other embodiments, the compressor interface 212 may comprise a plurality of terminals 214 for electrical connection to the compressor drive controller 144 and/or the outdoor controller 126.

The compressor drive controller 144 generally comprises a variable frequency drive controller that is primarily configured to electrically power and/or selectively control the compressor 116 through a wired interface 216. The compressor drive controller 144 may comprise a rectifier 218, a direct current (DC) link 220, and an inverter 222. The rectifier 218 may be configured to receive an incoming AC from a power source (generally 240 Volts AC) and convert it to a DC output. The DC link 220 may comprise a capacitor and/or a plurality of capacitors and be configured to store at least a portion of the DC received from the rectifier 218. The inverter 222 may be configured to convert the DC from the DC link 220 to a quasi-sinusoidal AC voltage output that electrically powers and selectively controls the speed and/or operation of the compressor 116. In some embodiments, the inverter 222 may comprise a plurality of transistors configured to output a 3-phase AC to power the compressor 116. More specifically, in some embodiments, the inverter 222 may comprise three insulated gate bipolar transistors configured to output a 3-phase pulse width modulated AC to power the compressor 116.

Additionally, the compressor drive controller 144 may also comprise a processing component 224 capable of implementing one or more of the embodiments disclosed herein. The processing component 224 may generally be configured to selectively control the rectifier 218, the DC link 220, and/or the inverter 222. In some embodiments, the processing component 224 may control the characteristics of the voltage and/or current output from the rectifier 218 and/or the inverter 222. In some embodiments, the processing component 224 may also be configured to selectively configure any of the components 218, 220, 222 to selectively achieve desired voltage and/or current output characteristics from the compressor drive controller 144. Further, the processing component 224 may also be configured to monitor a temperature of the compressor 116 and/or an ambient outdoor temperature. Still further, the processing component 224 may also be configured to communicate with and/or be controlled by the outdoor controller 126.

The outdoor controller 126 may generally comprise a processing component 232 capable of implementing one or more of the embodiments disclosed herein. The outdoor controller 126 may be electrically coupled to the compressor drive controller 144 through an interface 226 and may be configured to communicate with and/or control the compressor drive controller 144 via the interface 226. In some embodiments, the outdoor controller 126 may be configured to selectively communicate with the compressor drive controller 144 to selectively control operation of the compressor 116. In some embodiments, the outdoor controller 126 may also be configured to monitor a temperature of the compressor 116 and/or an outdoor ambient temperature. In some embodiments, the outdoor controller 126 may be configured to selectively control operation of the compressor drive controller 144 and/or the compressor 116 as a result of the measured temperature of the compressor 116.

Still referring to FIG. 2, when the compressor 116 remains idle with respect to operating in either of a heating mode or cooling mode to pump refrigerant through the HVAC system 100 of FIG. 1, the compressor heating system 200 may be configured to provide auxiliary heat to the idle compressor 116 to prevent refrigerant migration to the compressor 116. Generally, to provide auxiliary heat to the compressor 116, the compressor heating system 200 may be configured to induce a DC through the stator windings 208 of the compressor 116 to impart a sufficient amount of heat into the compressor 116 to prevent such refrigerant migration.

To deliver the DC to the stator windings 208 of the compressor 116, the compressor drive controller 144 may receive an incoming AC from a 240 Volt AC power source. The rectifier 218 of the compressor drive controller 144 may convert the incoming AC into a DC output. The DC may be passed to the DC link 220, where at least a portion of the DC received from the rectifier 218 may be stored via at least one capacitor. In some embodiments, however, the DC link 220 may comprise a plurality of capacitors to store at least a portion of the DC received from the rectifier 218. From the DC link 220, the DC may be delivered to the stator windings 208 of the compressor 116 through an interface 216 that connects the compressor drive controller 144 to the compressor 116 through at least one terminal 214 pair of the compressor interface 212. More specifically, as will be discussed in greater detail later with respect to FIG. 4, the DC from the DC link 220 may be fed through one of the three insulated gate bipolar transistors of the inverter 222 to one of the three magnetic poles of the stator windings 208. As the DC from the compressor drive controller 144 passes through the stator windings 208, heat may be produced by the resistance to the flow of the DC through the stator windings 208. The heat produced by the current may therefore be sufficient to heat the components of the compressor 116 to prevent refrigerant from migrating to the compressor 116.

It will be appreciated that a higher DC passed through the stator windings 208 may generally produce a higher heating output into the compressor 116. Consequently, a higher DC passed through the stator windings 208 may also produce a higher efficiency for the compressor drive controller 144 and/or a greater heating efficiency in the compressor 116. In one example, where 100 Watts of power is input into the compressor drive controller 144 of the compressor 116, about 40 Watts of heat may be induced into the compressor 116, resulting in about 40% heating efficiency. While a higher DC may be passed through the stator windings 208 to induce a greater amount of heat into the compressor 116, the internal components of the compressor drive controller 144 and/or compressor 116 may be susceptible to damage if a higher DC is sustained for an extended period of time. Although higher current and power is passed through the compressor 116 in short durations (pulse width modulation), the average power consumption by the compressor drive controller 144 and/or the compressor 116 may be less due to the higher efficiency of the compressor drive controller 144 with the higher power output. Alternatively, the compressor drive controller 144 and/or compressor 116 must be over-designed to handle the higher current and power consumption.

Accordingly, the compressor heating system 200 may be configured to deliver the DC to the stator windings 208 using pulse width modulation. To implement the pulse width modulation delivery, a pulse of a higher DC may be delivered from the compressor drive controller 144 to the stator windings 208 of the compressor 116 through any of the methods described herein for a first time period ("On" period), followed by a second time period where substantially no DC is delivered to the stator windings 208 of the compressor 116 ("Off" period). The pattern of alternating "On" and "Off" periods may continue during a total time period for which auxiliary heat is required to satisfy a heat requirement to the compressor 116. The ratio of time of "On" periods to the total time period for which auxiliary heat is required from the compressor heating system 200 may generally be referred to as the duty cycle. In some embodiments, the duty cycle may be at least about 40%, and possibly as high as about 60%.

By using pulse width modulation to provide alternating "On" and "Off" periods of DC delivery, the average power input into the stator windings 208 of the compressor 116 may generally be sufficient to keep refrigerant from migrating to the compressor 116. Further, because the internal components of the compressor 116 may be susceptible to damage if a higher DC is sustained for an extended period of time, by using pulse width modulation, a higher power is delivered during the "On" period, since the "Off" period allows cooling in between "On" cycles to prevent overheating and/or other damage to the internal components of the compressor 116. In some embodiments, the voltage may be about 320 Volts DC. Further, in some embodiments, by pulsing a 320 Volt DC, the average voltage output may be about 2.73 Volts DC from the compressor drive controller 144. Accordingly, about 40 Watts of heat may be provided into the compressor 116 by pulsing a 320 Volt, 14 Ampere DC into the compressor 116 (2.73 V×14=38.22 Watts). Thus, by delivering a higher voltage DC to the compressor 116 using pulse width modulation, a higher overall inverter 222 efficiency may be achieved in the compressor 116 as compared with a continuously delivered lower DC. In some embodiments, using a pulse width modulated high voltage DC may result in efficiencies of at least about 40%. In some embodiments, using a pulse width modulated higher DC results in efficiencies of at least about 60%.

Additionally, by using pulse width modulation to deliver the higher DC to the stator windings 208 of the compressor 116, the overall power consumption of the compressor heating system 200 needed to heat the compressor 116 may be lower than continuously supplying the DC to heat the compressor 116. This helps meet regulatory requirements where off-cycle power must average below specific thresholds.

The pulse width modulation may generally be implemented and/or controlled by at least one of the compressor drive controller 144 and/or the outdoor controller 126. More specifically, a pulse width modulation algorithm may be implemented and/or controlled by running the algorithm in at least one of the processing components 224, 232 of the compressor drive controller 144 and/or the outdoor controller 126. Additionally, in some embodiments, the outdoor controller 126 may be configured to implement an algorithm and/or program to control the pulse width modulation, while the compressor drive controller 144 may be configured to control the switching of the integrated gate bipolar transistors of the inverter 222 to deliver the DC to the stator windings 208 of the compressor 116.

In some embodiments, the compressor heating system 200 may be configured to provide auxiliary compressor heat based on the temperature of the compressor 116 and/or the ambient outdoor temperature. In some embodiments, however, the compressor heating system 200 may be configured to provide auxiliary compressor heat based on a target temperature of the compressor 116 as compared to the ambient outdoor temperature. Accordingly, in such embodiments, the compressor heating system 200 may be configured to maintain the temperature of the compressor 116 at least about 20-25 degrees Fahrenheit above the ambient outdoor temperature. To initiate the demand for auxiliary compressor heat, at least one of the compressor drive controller 144 and/or the outdoor controller 126 may be configured to monitor the temperature of the compressor 116 and/or the outdoor ambient temperature. In some embodiments, the compressor drive controller 144 may be configured to monitor the temperature of the compressor 116, while the outdoor controller 126 may be configured to monitor the ambient outdoor temperature. Additionally, the compressor drive controller 144 and/or the outdoor controller 126 may be configured to communicate temperature information bi-directionally to provide auxiliary compressor heat.

Figure 3:
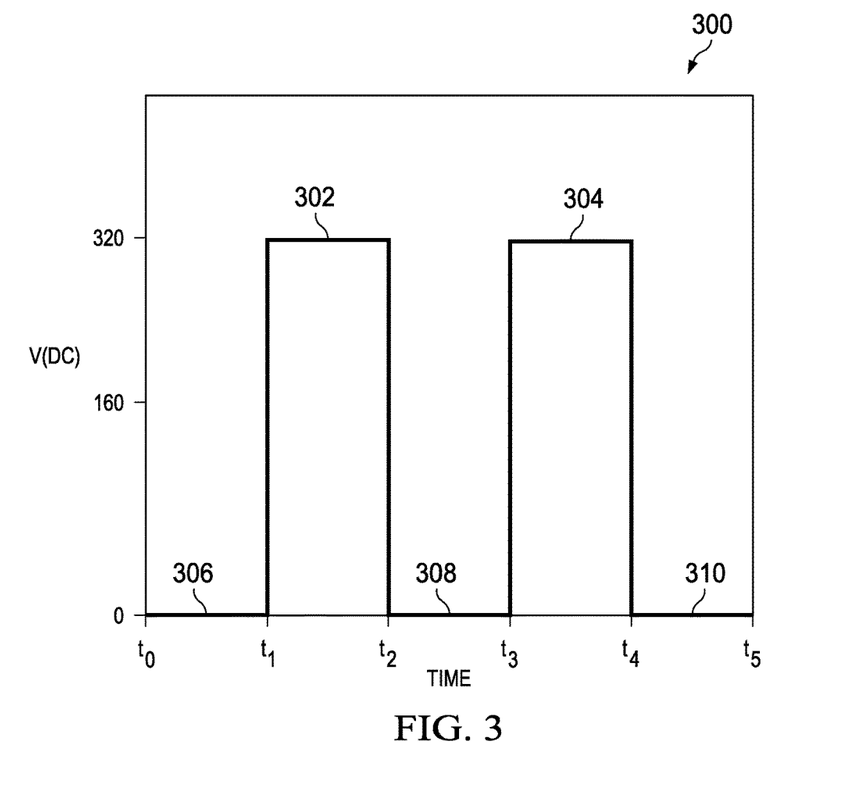
FIG. 3 is a chart of an example of a DC voltage curve delivered by the compressor heating system 200 of FIG. 2 using pulse width modulation according to an embodiment of the disclosure.

Referring now to FIG. 3, a chart 300 of an example of a DC voltage pulse delivered by the compressor heating system 200 of FIG. 2 using pulse width modulation is shown according to an embodiment of the disclosure. As stated, pulse width modulation may be implemented by delivering DC to the stator windings 208 of the compressor 116 for a first time period ("On" period), followed by a second time period where substantially no DC is delivered to the stator windings 208 of the compressor 116 ("Off" period). Further, the pattern of alternating "On" and "Off" periods may continue during a total time period for which auxiliary heat is required. Chart 300 depicts DC voltage delivered to the compressor 116 on the vertical y-axis with respect to time on the horizontal x-axis. In this example, chart 300 depicts two "On" periods 302, 304 alternating with three "Off" periods 306, 308, 310. During the "On" periods 302, 304, the DC voltage delivered to the compressor 116 may comprise at least about 320 Volts DC. Further, by pulsing the 320 Volt DC using a smaller pulse width modulation during the "On" period, in this example, the average voltage output may be about 2.73 Volts DC, thereby supplying at least an average of about 40 Watts to the compressor 116, and thus providing an increased heating efficiency to the compressor 116. By using a smaller pulse width modulation during the "On" periods, the average of about 40 Watts may be supplied to the compressor 116, whereas if a larger pulse width modulation were used during the "On" periods, the 320 Volt DC through the compressor 116 would result in 620 kilowatt (kW), which may harm the compressor 116 and/or the compressor drive controller 144.

While the pulse width modulation sequence is shown beginning with a first "Off" period 306, it will be appreciated that a demand for auxiliary compressor heat may alternatively begin at time $t_1$ with the first "On" period 302. The first "On" period 302 may last for a time period from time $t_1$ to time $t_2$, where the 320 Volt DC is delivered to the compressor 116. At time $t_2$, the DC voltage is no longer delivered to the compressor 116 for the second "Off" period 308 that lasts from time $t_2$ to time $t_3$. At time $t_3$, the second "On" period 304 will initiate, followed by the third "Off" period 310. The alternating sequence of "On" periods 302, 304 with "Off" periods 306, 308, 310 may continue as long as auxiliary compressor heat is needed by the compressor heating system 200 of FIG. 2. In some embodiments, the duration of the "On" time periods 302, 304 may be substantially similar to the duration of the "Off" time periods 306, 308, 310, resulting in a duty cycle of about 50%. However, in other embodiments, the duration of the "On" time periods 302, 304 may be different than the duration of the "Off" time periods 306, 308, 310 to achieve a specific duty cycle and/or average heating power supplied to the compressor 116. It will further be appreciated that the duration of the "On" periods 302, 304 may be substantially similar, while the duration of the "Off" periods 306, 308, 310 may be substantially similar.

Figure 4:
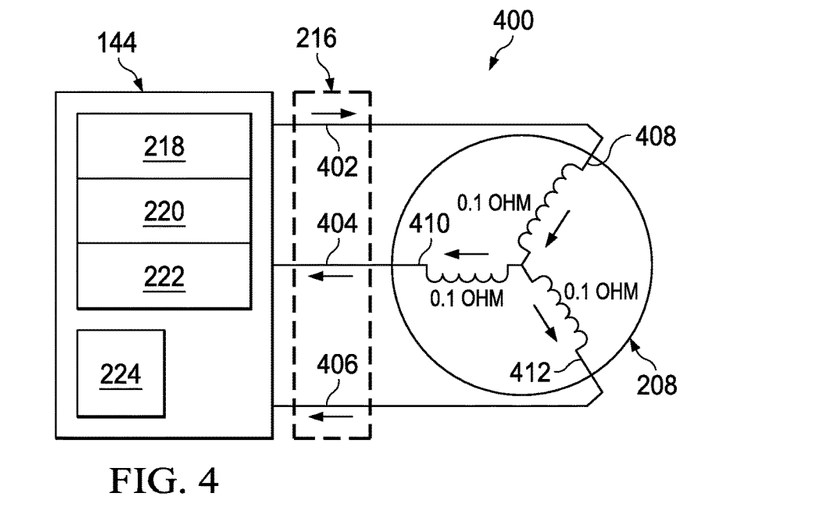
FIG. 4 is a schematic electrical diagram 400 of the interface between the compressor drive controller 144 and the stator windings 208 of the compressor heating system 200 of FIG. 2 according to an embodiment of the disclosure.

Referring now to FIG. 4, a schematic electrical diagram 400 of the interface between the compressor drive controller 144 and the stator windings 208 of the compressor heating system 200 of FIG. 2 is shown according to an embodiment of the disclosure. Because the motor 204 of the compressor 116 may comprise a three-phase AC induction motor, the stator windings 208 may comprise three magnetic poles 408, 410, 412 having an electrical resistance of about 0.1 ohms each. Accordingly, the interface 216 between the stator windings 208 and the compressor drive controller 144 may comprise three phase wires 402, 404, 406, each wire being associated with the respective magnetic poles 408, 410, 412 of the stator windings 208 and one of the three insulated gate bipolar transistors of the inverter 222 of the compressor drive controller 144. The U-phase wire 402 may be associated with the AC U-phase, the V-phase wire 404 may be associated with the AC V-phase, and the W-phase wire 406 may be associated with the AC W-phase. When the compressor heating system 200 is configured to deliver the DC to the stator windings 208 to heat the compressor 116, the DC may be delivered through any of the phase wires 402, 404, 406. In the shown embodiment, the DC is delivered through the U-phase wire 402 and returns through the V-phase wire 404 and the W-phase wire 406.

With reference to FIG. 2 and the example of FIG. 3, when the 320 Volt DC is delivered using phase width modulation to the stator windings 208 through the U-phase wire 402, the average voltage output delivered to the stator windings 208 may be about 2.73 Volts DC. Accordingly, to induce about 40 Watts of heat into the compressor 116, a 320 Volt, 14 Ampere DC may be passed through the U-phase wire 402 (2.73 V×14=38.22 Watts). As a result, about 7 Amperes DC may be passed through each of the V-phase wire 404 and W-phase wire 406.

Figure 5:
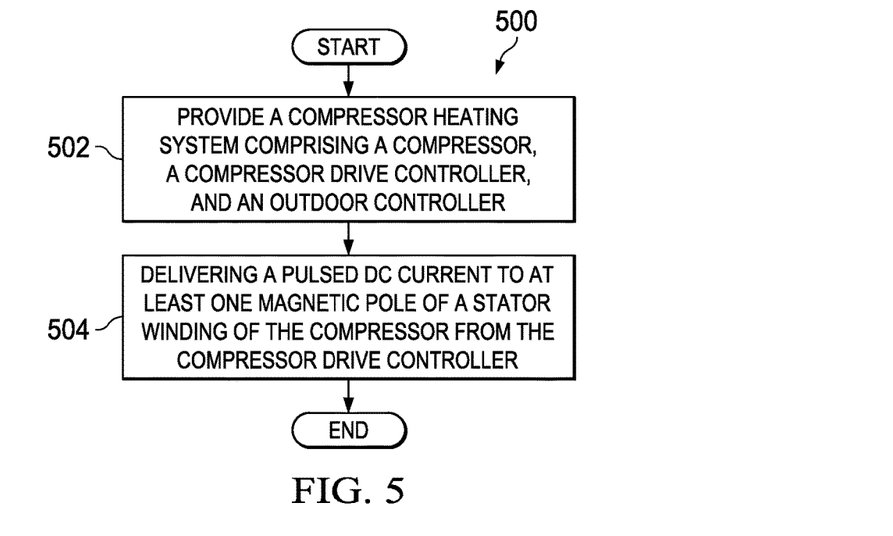
FIG. 5 is a flowchart of a method of heating a compressor according to an embodiment of the disclosure.

Referring now to FIG. 5, a flowchart of a method 500 of heating a compressor is shown according to an embodiment of the disclosure. The method 500 may begin at block 502 by providing a compressor heating system comprising a compressor, a compressor drive controller, and an outdoor controller in an HVAC system. In some embodiments, the compressor heating system may be compressor heating system 200. The method 500 may conclude at block 504 by delivering a pulsed DC to at least one magnetic pole of a stator winding of the compressor from the compressor drive controller.

Figure 6:
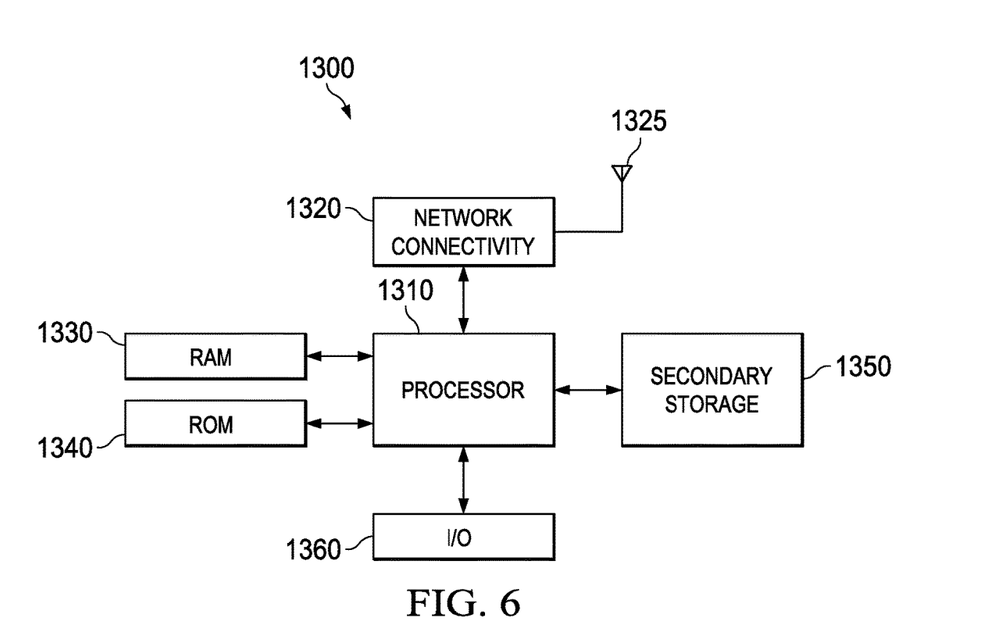
FIG. 6 is a schematic diagram of a general-purpose processor according to an embodiment of the disclosure.

Referring now to FIG. 6, a schematic diagram of a general-purpose processor (e.g., electronic controller or computer) system 1300 is shown according to an embodiment of the disclosure. In some embodiments, processing component 224 and/or processing component 232 of FIG. 2 may be processing system 1300 that is suitable for implementing one or more embodiments disclosed herein. In addition to the processor 1310 (which may be referred to as a central processor unit or CPU), the system 1300 may comprise network connectivity devices 1320, random access memory (RAM) 1330, read only memory (ROM) 1340, secondary storage 1350, and input/output (I/O) devices 1360. In some cases, some of these components may not be present or may be combined in various combinations with one another or with other components not shown. These components may be located in a single physical entity or in more than one physical entity. Any actions described herein as being taken by the processor 1310 might be taken by the processor 1310 alone or by the processor 1310 in conjunction with one or more components of the processor system 1300.

The processor 1310 generally executes algorithms, instructions, codes, computer programs, and/or scripts that it might access from the network connectivity devices 1320, RAM 1330, ROM 1340, or secondary storage 1350 (which might include various disk-based systems such as hard disk, floppy disk, optical disk, or other drive). While only one processor 1310 is shown, processor system 1300 may comprise multiple processors 1310. Thus, while instructions may be discussed as being executed by a processor 1310, the instructions may be executed simultaneously, serially, or otherwise by one or multiple processors 1310. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, Bluetooth, CAN (Controller Area Network) and/or other well-known technologies, protocols and standards for connecting to networks. These network connectivity devices 1320 may enable the processor 1310 to communicate with the Internet or one or more telecommunications networks or other networks from which the processor 1310 might receive information or to which the processor 1310 might output information.

The network connectivity devices 1320 might also include one or more transceiver components 1325 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1325 might include separate receiving and transmitting units or a single transceiver. Information transmitted or received by the transceiver component 1325 may include data that has been processed by the processor 1310 or instructions that are to be executed by processor 1310. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than access to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs or instructions that are loaded into RAM 1330 when such programs are selected for execution or information is needed.

The I/O devices 1360 may include liquid crystal displays (LCDs), touch screen displays, keyboards, keypads, switches, dials, mice, track balls, voice recognizers, card readers, paper tape readers, printers, video monitors, transducers, sensors, or other well-known input or output devices. Also, the transceiver component 1325 might be considered to be a component of the I/O devices 1360 instead of or in addition to being a component of the network connectivity devices 1320. Some or all of the I/O devices 1360 may be substantially similar to various components disclosed herein.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 10 percent of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A compressor heating system, comprising:
    a compressor including a motor, wherein the motor includes a stator winding;
    a compressor drive controller electrically coupled to the compressor and configured to selectively provide a pulsed direct current (DC) to the stator winding of the motor of the compressor to impart heat into the compressor to prevent refrigerant migration to the compressor; and
    an outdoor unit controller electrically coupled to the compressor drive controller.

2. The compressor heating system of claim 1, wherein the outdoor unit controller is configured to run a pulse width modulation algorithm.

3. The compressor heating system of claim 1, wherein the outdoor unit controller is configured to selectively control the compressor drive controller to cause the compressor drive controller to deliver the pulsed DC.

4. The compressor heating system of claim 1, wherein the outdoor unit controller is configured to selectively control the compressor drive controller to cause the compressor drive controller to deliver the pulsed DC using pulse width modulation.

5. The compressor heating system of claim 1, wherein the outdoor unit controller is configured to maintain the temperature of the compressor at least 20 degrees Fahrenheit above the ambient outdoor temperature.

6. The compressor heating system of claim 1, wherein the pulsed DC comprises a voltage of 320 volts DC.

7. The compressor heating system of claim 6, wherein the stator winding is configured to provide 40 watts of heat into the compressor.

8. A heating, ventilation, and/or air conditioning (HVAC) system, comprising:
    a compressor heating system including:
        a compressor including a motor, wherein the motor includes a stator winding;
        a compressor drive controller electrically coupled to the compressor and configured to selectively provide a pulsed direct current (DC) to the stator winding of the motor of the compressor to impart heat into the compressor to prevent refrigerant migration to the compressor; and an outdoor unit controller electrically coupled to the compressor drive controller.

9. The HVAC system of claim 8, wherein the outdoor unit controller is configured to run a pulse width modulation algorithm.

10. The HVAC system of claim 8, wherein the outdoor unit controller is configured to selectively control the compressor drive controller to cause the compressor drive controller to deliver the pulsed DC current.

11. The HVAC system of claim 8, wherein the outdoor unit controller is configured to selectively control the compressor drive controller to cause the compressor drive controller to deliver the pulsed DC current using pulse width modulation.

12. The HVAC system of claim 8, wherein the outdoor unit controller is configured to maintain the temperature of the compressor at least 20 degrees Fahrenheit above the ambient outdoor temperature.

13. The HVAC system of claim 8, wherein the pulsed DC comprises a voltage of 320 volts DC.

14. The HVAC system of claim 8, wherein the stator winding is configured to provide at least 40 watts of heat into the compressor.

15. A method of heating a compressor of a heating, ventilation, and/or air conditioning (HVAC) system, the method comprising:
providing a compressor heating system including a compressor, wherein the compressor includes a motor and wherein the motor includes a stator winding;
providing a compressor drive controller electrically coupled to the compressor, and an outdoor unit controller electrically coupled to the compressor drive controller;
selectively pulsing a direct current (DC) through the stator winding of the motor of the compressor to impart heat into the compressor to prevent refrigerant migration to the compressor; and,
delivering DC from the compressor drive controller to the stator winding of the motor of the compressor.

16. The method of claim 15, wherein the outdoor unit controller is configured to selectively control the compressor drive controller to cause the compressor drive controller to deliver the pulsed DC.

17. The method of claim 16, wherein the selectively pulsing is accomplished by running a pulse width modulation algorithm in the outdoor unit controller.

* * * * *